(12) United States Patent
Neal et al.

(10) Patent No.: US 11,853,022 B2
(45) Date of Patent: Dec. 26, 2023

(54) OVEN COOKING CYCLE WITH POST-PREHEAT AND/OR TWO STAGE PREHEAT PHASES

(71) Applicant: Midea Group Co., Ltd., Foshan (CN)

(72) Inventors: Vern A. Neal, Louisville, KY (US); Clayton James O'Donoghue, Simpsonville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 191 days.

(21) Appl. No.: 17/211,936

(22) Filed: Mar. 25, 2021

(65) Prior Publication Data

US 2022/0308537 A1    Sep. 29, 2022

(51) Int. Cl.
*G05B 19/042* (2006.01)
*F24C 15/00* (2006.01)
*F24C 1/00* (2006.01)

(52) U.S. Cl.
CPC .............. *G05B 19/042* (2013.01); *F24C 1/00* (2013.01); *F24C 15/00* (2013.01); *G05B 2219/2643* (2013.01)

(58) Field of Classification Search
CPC .......... G05B 19/042; G05B 2219/2643; G05B 19/0426; F24C 1/00; F24C 15/00
See application file for complete search history.

(56) References Cited

U.S. PATENT DOCUMENTS

| | | | |
|---|---|---|---|
| 4,886,954 A * | 12/1989 | Yu | C30B 31/12 219/390 |
| 5,291,514 A * | 3/1994 | Heitmann | G05D 23/22 219/390 |
| 5,534,678 A | 7/1996 | Bowles et al. | |
| 6,337,468 B1 | 1/2002 | Worthington et al. | |
| 6,388,235 B1 | 5/2002 | Sauter et al. | |
| 6,570,136 B1 | 5/2003 | Lockwood et al. | |
| 6,979,804 B1 | 12/2005 | Boyer | |
| 7,468,495 B2 | 12/2008 | Carbone et al. | |
| 9,119,231 B2 | 8/2015 | Johnson et al. | |
| 9,506,657 B2 | 11/2016 | Armstrong et al. | |
| 10,448,457 B2 | 10/2019 | Johnson et al. | |
| 10,638,881 B1 * | 5/2020 | Holt | A47J 37/0754 |
| 10,677,472 B2 | 6/2020 | Johnson et al. | |
| 2003/0015518 A1 * | 1/2003 | Baker | F24C 7/087 219/486 |

(Continued)

OTHER PUBLICATIONS

Pinola, Melanie, Skip Waiting for Your Oven to Preheat by Using the Broiler Instead, Life Hacker, Retrieved from: https://lifehacker.com/skip-waiting-for-your-oven-to-preheat-by-using-the-broi-5985619, dated Feb. 20, 2013.

*Primary Examiner* — Chad G Erdman
(74) *Attorney, Agent, or Firm* — Gray Ice Higdon

(57) ABSTRACT

A cooking appliance may employ one or both of a post-preheat phase and a two stage preheat phase to both accelerate preheating of an oven cavity while minimizing temperature differentials therein. A post-preheat phase may be performed subsequent to a preheat phase, but prior to a cooking phase, to cycle a cooking element disposed in a cooler portion of an oven cavity to reduce a temperature differential between the top and bottom of the oven cavity. A two stage preheat phase may sequentially activate each of top and bottom cooking elements in an oven cavity a single time.

15 Claims, 7 Drawing Sheets

(56) References Cited

U.S. PATENT DOCUMENTS

| | | | | |
|---|---|---|---|---|
| 2006/0090741 A1* | 5/2006 | Bowles | ............... | F24C 15/322 |
| | | | | 126/41 R |
| 2008/0237212 A1* | 10/2008 | Blackson | ............... | F24C 7/087 |
| | | | | 219/398 |
| 2009/0136640 A1* | 5/2009 | Embury | ............... | A23L 5/13 |
| | | | | 426/510 |
| 2010/0147280 A1* | 6/2010 | Bonuso | ............... | F24C 15/325 |
| | | | | 126/21 A |
| 2010/0193507 A1* | 8/2010 | Zimmer | ............... | H05B 6/6485 |
| | | | | 219/681 |
| 2016/0273778 A1* | 9/2016 | Son | ............... | F24C 15/2007 |
| 2018/0119962 A1* | 5/2018 | Otsuki | ............... | F24C 7/043 |
| 2020/0229639 A1 | 7/2020 | Swayne et al. | | |

\* cited by examiner

OVEN COOKING CYCLE WITH POST-PREHEAT AND/OR TWO STAGE PREHEAT PHASES

BACKGROUND

Cooking appliances that include ovens, e.g., ranges, wall-mounted ovens, and the like, generally incorporate multiple cooking elements disposed at different locations in an oven cavity. One or more bake cooking elements are generally positioned on the bottom or underneath the bottom of the oven cavity, while one or more broiler cooking elements are generally positioned near the top of the oven cavity (for the purpose of simplification, this description will use the term "cooking element" to refer to any of the various heat sources that may be utilized to generate the heat required for cooking, which may include, but are not limited to, resistive electrical heating elements, gas burners, infrared heaters, quartz heaters, etc.) When performing an oven cooking cycle with a cooking appliance, a user generally selects a temperature setpoint at which the oven is to be maintained during cooking. The period during which the oven temperature is raised to this temperature setpoint is generally referred to as a preheat phase, during which one or both of the bake and broiler cooking elements are activated to heat the oven cavity to the temperature setpoint. Once the temperature setpoint is reached, an alert such as a beep is generally generated to inform the user that the oven cavity is now at the desired temperature and food may now be placed in the oven cavity to be cooked.

Preheating an oven cavity, however, can take a substantial amount of time, particularly when higher temperatures are desired, and as a result efforts have been made to speed up the preheat process. In many cooking appliance designs, however, technical limitations prevent multiple cooking elements from being activated simultaneously, and moreover, activating one cooking element while another is inactive can generate temperature differentials within the oven cavity. With electric ovens, for example, preheat phases often rely on extended use of the broiler cooking element, as this cooking element is typically more powerful that the bake cooking element and is physically located within the oven cavity (unlike "hidden" bake cooking elements that are located below the oven cavity). With gas ovens, preheat phases often rely on the bake cooking element at the bottom of the oven cavity, as air heated by the broiler cooking element is more likely to exit the oven vent than be circulated within the oven cavity. In both cases, the design tends to lean heavily or exclusively on a single cooking element, with the result that the oven cavity wall surfaces are heated unevenly when the preheat period ends. As a result, foods that are placed in the oven immediately after the preheat phase completes may not be evenly cooked top-to-bottom.

As a result, a substantial need continues to exist in the art for a manner of minimizing the duration of a preheat phase while minimizing temperature differentials within the oven cavity.

SUMMARY

The herein-described embodiments address these and other problems associated with the art by employing one or both of a post-preheat phase and a two stage preheat phase to both accelerate preheating of an oven cavity while minimizing temperature differentials therein. A post-preheat phase may be performed subsequent to a preheat phase, but prior to a cooking phase, to cycle a cooking element disposed in a cooler portion of an oven cavity to reduce a temperature differential between the top and bottom of the oven cavity. A two stage preheat phase may sequentially activate each of top and bottom cooking elements in an oven cavity a single time.

Therefore, consistent with one aspect of the invention, a cooking appliance may include a housing including an oven cavity, a temperature sensor configured to sense a temperature within the oven cavity, a plurality of cooking elements configured to generate heat within the oven cavity, the plurality of cooking elements including at least one cooking element positioned proximate a bottom of the oven cavity and at least one cooking element positioned proximate a top of the oven cavity, and a controller in communication with the temperature sensor and configured to control the plurality of elements to perform a cooking cycle within the oven cavity. The controller may be configured to perform the cooking cycle by, during a cooking phase of the cooking cycle, cycling one or more of the plurality of cooking elements to maintain a predetermined temperature setpoint, during a preheat phase preceding the cooking phase, cycling one or more of the plurality of cooking elements to heat at least a portion of the oven cavity to the predetermined temperature setpoint, and during a post-preheat phase subsequent to the preheat phase and preceding the cooking phase, cycling one or more of the plurality of cooking elements disposed in a cooler portion of the oven cavity to reduce a temperature differential between the top and bottom of the oven cavity.

Moreover, in some embodiments, the controller is further configured to generate a user alert upon completion of the preheat phase to notify a user that the temperature setpoint has been reached. Further, in some embodiments, the controller is configured to perform the post-preheat phase subsequent to generating the user alert. Also, in some embodiments, cycling the one or more of the plurality of cooking elements during the preheat phase causes the top of the oven cavity to be at a higher temperature than the bottom of the oven cavity, and the controller is configured to cycle the one or more of the plurality of cooking elements during the post-preheat phase disposed in the cooler portion of the oven cavity by activating only the at least one cooking element positioned proximate the bottom of the oven cavity during the post-preheat phase. Further, in some embodiments, cycling the one or more of the plurality of cooking elements during the preheat phase causes the top of the oven cavity to be at a lower temperature than the bottom of the oven cavity, and the controller is configured to cycle the one or more of the plurality of cooking elements during the post-preheat phase disposed in the cooler portion of the oven cavity by activating only the at least one cooking element positioned proximate the top of the oven cavity during the post-preheat phase.

In some embodiments, the controller is configured to cycle the one or more of the plurality of cooking elements during the post-preheat phase disposed in the cooler portion of the oven cavity by activating only and for an entire duration of the post-preheat phase the at least one cooking element positioned proximate the top of the oven cavity or the at least one cooking element positioned proximate the bottom of the oven cavity. Also, in some embodiments, the controller is configured to cycle the one or more of the plurality of cooking elements during the preheat phase by alternating between the at least one cooking element positioned proximate the top of the oven cavity and the at least one cooking element positioned proximate the bottom of the oven cavity.

In some embodiments, the at least one cooking element positioned proximate the top of the oven cavity includes an electrical broiler cooking element, the at least one cooking element positioned proximate the bottom of the oven cavity includes an electrical bake cooking element, and the controller is configured to alternate between the at least one cooking element positioned proximate the top of the oven cavity and the at least one cooking element positioned proximate the bottom of the oven cavity by alternating between the electrical broiler cooking element and the electrical bake cooking element with a duty cycle in which the electrical broiler cooking element is operated longer than the electrical bake cooking element. Further, in some embodiments, the at least one cooking element positioned proximate the top of the oven cavity includes a gas broiler cooking element, the at least one cooking element positioned proximate the bottom of the oven cavity includes a gas bake cooking element, and the controller is configured to alternate between the at least one cooking element positioned proximate the top of the oven cavity and the at least one cooking element positioned proximate the bottom of the oven cavity by alternating between the gas broiler cooking element and the gas bake cooking element with a duty cycle in which the gas bake cooking element is operated longer than the gas broiler cooking element.

In some embodiments, the controller is configured to transition from the preheat phase to the post-preheat phase in response to determining that a preheat completion criterion has been met. Further, in some embodiments, the preheat completion criterion is met when a temperature sensed by a temperature sensor in the oven cavity senses that the predetermined temperature setpoint has been reached. Also, in some embodiments, the controller is configured to transition from the post-preheat phase to the cooking phase in response to determining that a post-preheat completion criterion has been met. In addition, in some embodiments, the controller is configured to determine that the post-preheat completion criterion has been met based upon a temperature sensed by a temperature sensor disposed proximate a middle, the top or the bottom of the oven cavity, based upon a duration calculated based upon the predetermined temperature setpoint, or based upon a duration calculated based upon a duration of the preheat phase.

In some embodiments, the controller is configured to cycle the one or more of the plurality of cooking elements during the preheat phase by sequentially activating the at least one cooking element positioned proximate the top of the oven cavity a single time during the preheat phase and activating the at least one cooking element positioned proximate the bottom of the oven cavity a single time during the preheat phase.

Consistent with another aspect of the invention, a cooking appliance may include a housing including an oven cavity, a temperature sensor configured to sense a temperature within the oven cavity, a plurality of cooking elements configured to generate heat within the oven cavity, the plurality of cooking elements including at least one cooking element positioned proximate a bottom of the oven cavity and at least one cooking element positioned proximate a top of the oven cavity, and a controller in communication with the temperature sensor and configured to control the plurality of elements to perform a cooking cycle within the oven cavity. The controller may be configured to perform the cooking cycle by, during a cooking phase of the cooking cycle, cycling one or more of the plurality of cooking elements to maintain a predetermined temperature setpoint, and during a preheat phase preceding the cooking phase, sequentially activating the at least one cooking element positioned proximate the top of the oven cavity a single time and activating the at least one cooking element positioned proximate the bottom of the oven cavity a single time.

In addition, in some embodiments, the controller is further configured to generate a user alert upon completion of the preheat phase to notify a user that the temperature setpoint has been reached. Also, in some embodiments, the plurality of cooking elements are electrical cooking elements, and the controller is configured to activate the at least one cooking element positioned proximate the top of the oven cavity the single time prior to activating the at least one cooking element positioned proximate the bottom of the oven cavity the single time. In addition, in some embodiments, the plurality of cooking elements are gas cooking elements, and the controller is configured to activate the at least one cooking element positioned proximate the top of the oven cavity the single time after activating the at least one cooking element positioned proximate the bottom of the oven cavity the single time.

In some embodiments, the controller is configured to transition between activating the at least one cooking element positioned proximate the top of the oven cavity the single time and activating the at least one cooking element positioned proximate the bottom of the oven cavity the single time in response to determining that a preheat first stage completion criterion has been met. Further, in some embodiments, the controller is configured to determine that the preheat first stage completion criterion has been met based upon meeting a predetermined percentage of the predetermined temperature setpoint, a predetermined temperature sensed in the oven cavity, a predetermined duration, or a predetermined percentage of a preheat duration.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described example embodiments of the invention. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
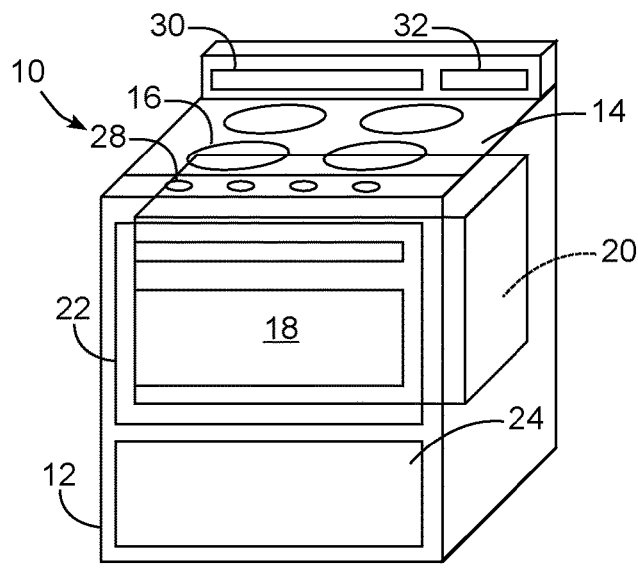
FIG. 1 is a perspective view of a cooking appliance consistent with some embodiments of the invention.

Turning now to the drawings, wherein like numbers denote like parts throughout the several views, FIG. 1 illustrates an example cooking appliance 10 in which the various technologies and techniques described herein may be implemented. Cooking appliance 10 is a residential-type range, and as such includes a housing 12, a stovetop or cooktop 14 including a plurality of burners 16, and an oven 18 defining an oven or cooking cavity 20 accessed via an oven door 22. Cooking appliance 10 may also include a storage drawer 24 in some embodiments, or in other embodiments, may include a second oven. Various cooking elements (not shown in FIG. 1) may also be incorporated into cooking appliance 10 for cooking food in oven 18, e.g., one or more electric or gas cooking elements.

Cooking appliance 10 may also include various user interface devices, including, for example, control knobs 28 for controlling burners 16, a control panel 30 for controlling oven 18 and/or burners 16, and a display 32 for providing visual feedback as to the activation state of the cooking appliance. It will be appreciated that cooking appliance 10 may include various types of user controls in other embodiments, including various combinations of switches, buttons, knobs and/or sliders, typically disposed at the rear or front (or both) of the cooking appliance. Further, in some embodiments, one or more touch screens may be employed for interaction with a user. As such, in some embodiments, display 32 may be touch sensitive to receive user input in addition to displaying status information and/or otherwise interacting with a user. In still other embodiments, cooking appliance 10 may be controllable remotely, e.g., via a smartphone, tablet, personal digital assistant or other networked computing device, e.g., using a web interface or a dedicated app.

Display 32 may also vary in different embodiments, and may include individual indicators, segmented alphanumeric displays, and/or dot matrix displays, and may be based on various types of display technologies, including LEDs, vacuum fluorescent displays, incandescent lights, etc. Further, in some embodiments audio feedback may be provided to a user via one or more speakers, and in some embodiments, user input may be received via a spoken or gesture-based interface.

As noted above, cooking appliance 10 of FIG. 1 is a range, which combines both a stovetop and one or more ovens, and which in some embodiments may be a standalone or drop-in type of range. In other embodiments, however, cooking appliance 10 may be another type of cooking appliance, e.g., a wall mount or freestanding oven. In general, a cooking appliance consistent with the invention may be considered to include any residential-type appliance including a housing and one or more cooking elements disposed therein and configured to generate energy for cooking food within one or more oven cavities.

In turn, a cooking element may be considered to include practically any type of energy-producing element used in residential applications in connection with cooking food, e.g., employing various cooking technologies such as electric, gas, light, microwaves, induction, convection, radiation, etc. In the case of an oven, for example, one or more cooking elements therein may be gas, electric, light, or microwave cooking elements in some embodiments, while in the case of a stovetop, one or more cooking elements therein may be gas, electric, or inductive cooking elements in some embodiments. Further, it will be appreciated that any number of cooking elements may be provided in a cooking appliance (including multiple cooking elements for performing different types of cooking cycles such as baking or broiling, including multiple bake and/or multiple broiler cooking elements, as well as one or more convection cooking elements), and that multiple types of cooking elements may be combined in some embodiments, e.g., combinations of microwave and light cooking elements in some oven embodiments.

Figure 2:
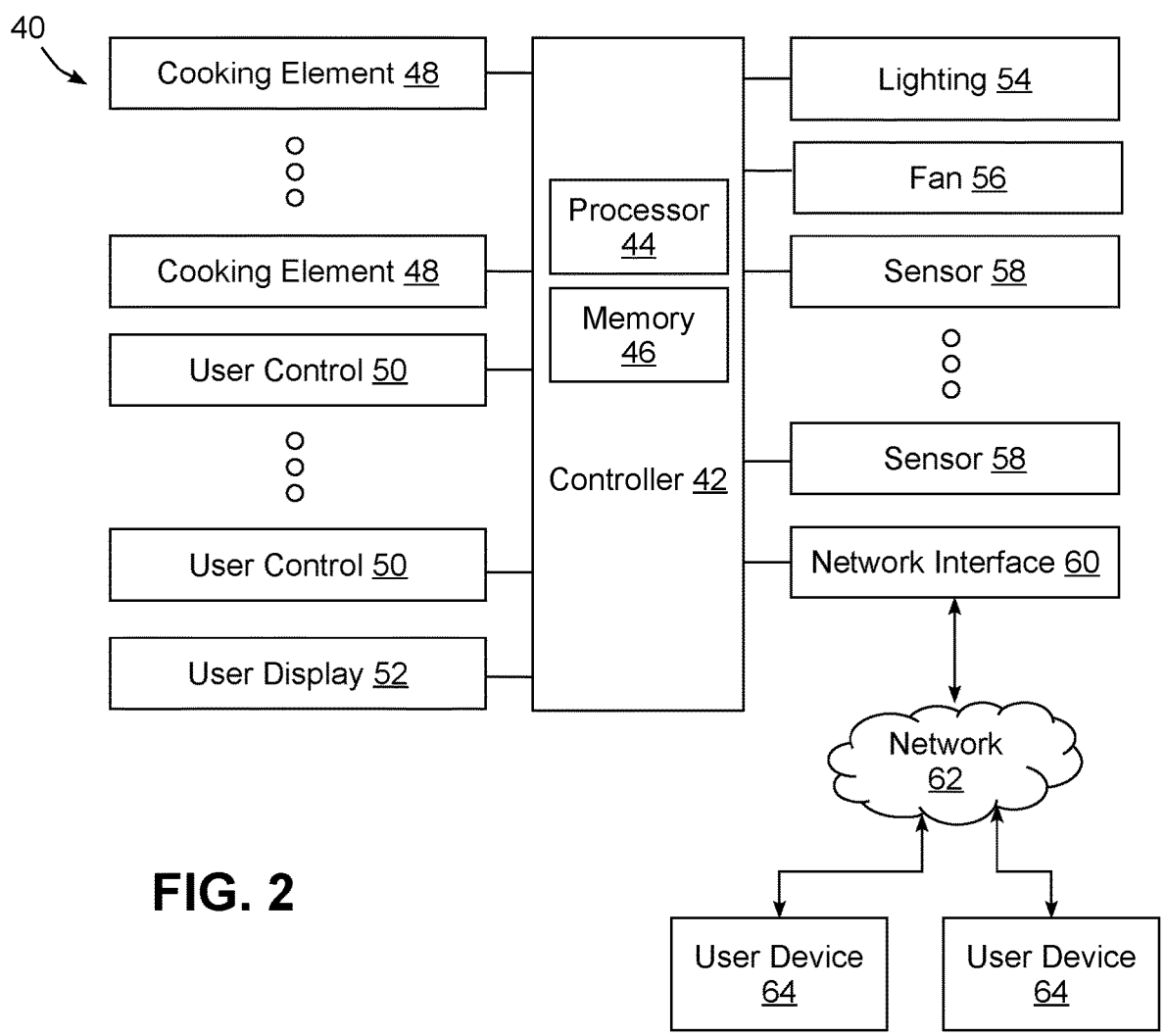
FIG. 2 is a block diagram of an example control system for a cooking appliance consistent with some embodiments of the invention.

A cooking appliance consistent with the invention also generally includes one or more controllers configured to control the cooking elements and otherwise perform cooking operations at the direction of a user. FIG. 2, for example, illustrates an example embodiment of a cooking appliance 40 including a controller 42 that receives inputs from a number of components and drives a number of components in response thereto. Controller 42 may, for example, include one or more processors 44 and a memory 46 within which may be stored program code for execution by the one or more processors. The memory may be embedded in controller 42, but may also be considered to include volatile and/or non-volatile memories, cache memories, flash memories, programmable read-only memories, read-only memories, etc., as well as memory storage physically located elsewhere from controller 42, e.g., in a mass storage device or on a remote computer interfaced with controller 42.

As shown in FIG. 2, controller 42 may be interfaced with various components, including various cooking elements 48 used for cooking food (e.g., various combinations of gas, electric, inductive, light, microwave, light cooking elements, among others), one or more user controls 50 for receiving user input (e.g., various combinations of switches, knobs, buttons, sliders, touchscreens or touch-sensitive displays, microphones or audio input devices, image capture devices, etc.), and a user display 52 (including various indicators, graphical displays, textual displays, speakers, etc.), as well as various additional components suitable for use in a cooking appliance, e.g., lighting 54 and/or one or more fans 56 (e.g., convection fans, cooling fans, etc.), among others.

Controller 42 may also be interfaced with various sensors 58 located to sense environmental conditions inside of and/or external to cooking appliance 40, e.g., one or more temperature sensors, humidity sensors, air quality sensors, smoke sensors, carbon monoxide sensors, odor sensors and/or electronic nose sensors, among others. Such sensors may be internal or external to cooking appliance 40, and may be coupled wirelessly to controller 42 in some embodiments. Sensors 58 may include, for example, one or more temperature sensors for sensing an air temperature within an oven cavity, including, for example, a temperature sensor for sensing temperature in a center of the oven cavity and/or one or more temperature sensors for sensing temperature in the top and/or bottom of the oven cavity.

In some embodiments, controller 42 may also be coupled to one or more network interfaces 60, e.g., for interfacing with external devices via wired and/or wireless networks such as Ethernet, Wi-Fi, Bluetooth, NFC, cellular and other suitable networks, collectively represented in FIG. 2 at 62. Network 62 may incorporate in some embodiments a home automation network, and various communication protocols may be supported, including various types of home automation communication protocols. In other embodiments, other wireless protocols, e.g., Wi-Fi or Bluetooth, may be used. In some embodiments, cooking appliance 40 may be interfaced with one or more user devices 64 over network 62, e.g., computers, tablets, smart phones, wearable devices, etc., and through which cooking appliance 40 may be controlled and/or cooking appliance 40 may provide user feedback.

In some embodiments, controller 42 may operate under the control of an operating system and may execute or otherwise rely upon various computer software applications, components, programs, objects, modules, data structures, etc. In addition, controller 42 may also incorporate hardware logic to implement some or all of the functionality disclosed herein. Further, in some embodiments, the sequences of operations performed by controller 42 to implement the embodiments disclosed herein may be implemented using a program code including one or more instructions that are resident at various times in various memory and storage devices, and that, when read and executed by one or more hardware-based processors, perform the operations embodying desired functionality. Moreover, in some embodiments, such program code may be distributed as a program product in a variety of forms, and that the invention applies equally regardless of the particular type of computer readable media used to actually carry out the distribution, including, for example, non-transitory computer readable storage media. In addition, it will be appreciated that the various operations described herein may be combined, split, reordered, reversed, varied, omitted, parallelized and/or supplemented with other techniques known in the art, and therefore, the invention is not limited to the particular sequences of operations described herein.

Numerous variations and modifications to the cooking appliances illustrated in FIGS. 1-2 will be apparent to one of ordinary skill in the art, as will become apparent from the description below. Therefore, the invention is not limited to the specific implementations discussed herein.

Cooking Cycle with Post-Preheat Phase

Preheating an oven cavity can take a substantial amount of time, particularly when higher temperatures are desired. In many cooking appliance designs, however, technical limitations prevent multiple cooking elements from being activated simultaneously. For electric cooking elements, household circuit capacities generally limit the total power draw of a cooking appliance, and for gas cooking elements, airflow and combustion limitations may limit simultaneous use of multiple cooking elements.

Activating one cooking element while another is inactive, however, can generate temperature differentials within the oven cavity. With electric ovens, for example, preheat phases often rely on extended use of the broiler cooking element, as this cooking element is typically more powerful that the bake cooking element and is physically located within the oven cavity. With gas ovens, preheat phases often rely on the bake cooking element at the bottom of the oven cavity, as air heated by the broiler cooking element is more likely to exit the oven vent than be circulated within the oven cavity. In both cases, the design tends to lean heavily or exclusively on a single cooking element, with the result that the oven cavity wall surfaces are heated unevenly when the preheat period ends. As a result, foods that are placed in the oven immediately after the preheat phase completes may not be evenly cooked top-to-bottom.

Figure 3:
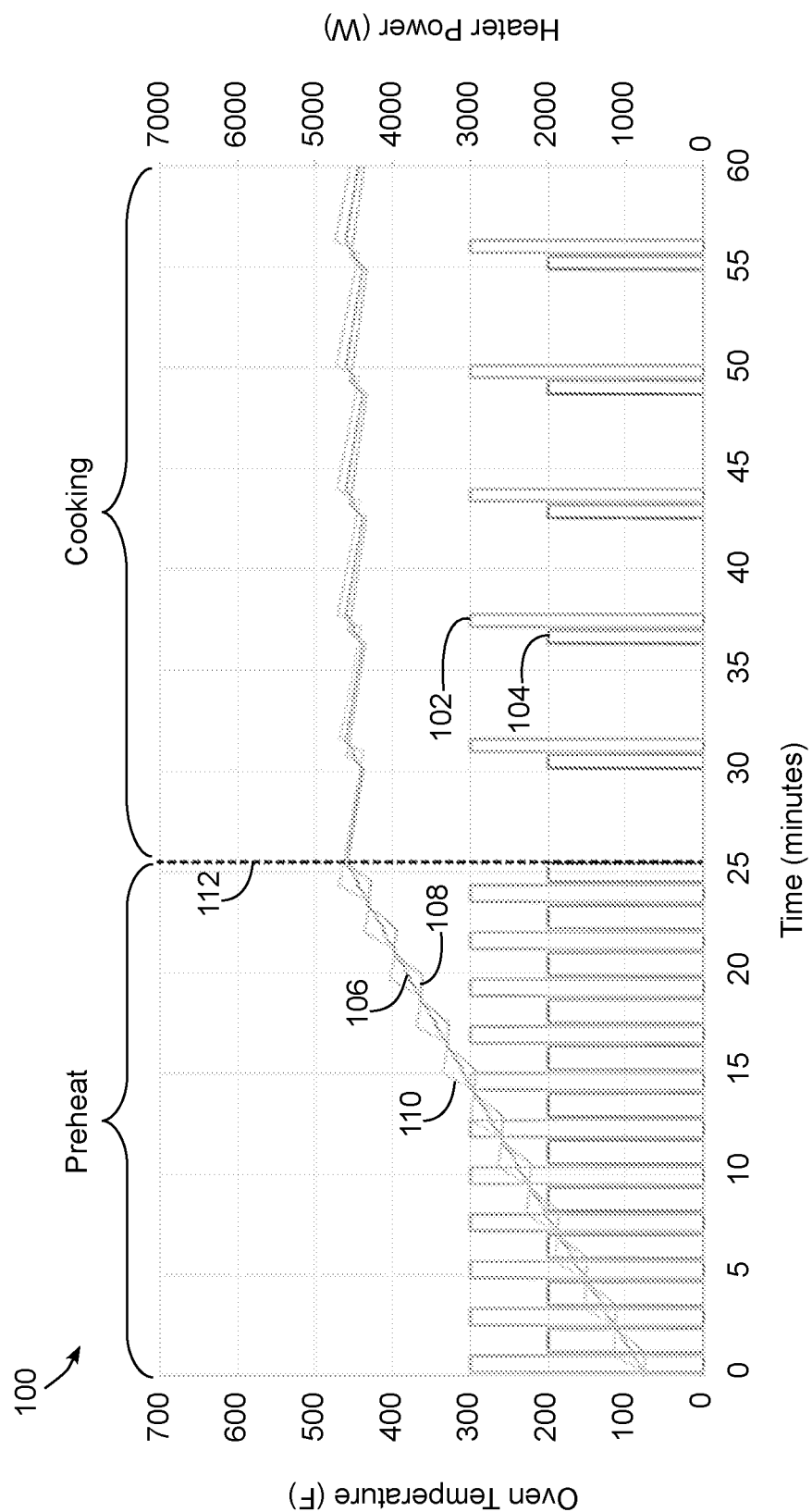
FIG. 3 is a graph of an example time-temperature curve for an example cooking appliance.

FIG. 3, for example, illustrates at 100 a time-temperature graph for a cooking cycle performed with an example cooking appliance including electric broiler and bake cooking elements, the activations of which are represented at 102 and 104, respectively. It may be seen from this graph that the broiler cooking element may be a 3000 watt element while the bake cooking element may be a 2000 watt element, although other cooking element designs may be used in other embodiments. A temperature setpoint of 450 degrees Fahrenheit is used in this example, and it is assumed that a temperature sensor in the oven cavity is positioned near the center of the oven cavity and is used to determine when the temperature setpoint has been reached.

In order to have good baking performance, it is generally desirable to have the heat distributed evenly with the oven cavity, which may be achieved by cycling the broiler and bake cooking elements so that the top and bottom of the oven cavity maintain similar temperatures. Particularly in a "hidden bake" oven, this generally requires the lower power cooking element to operate for a larger percentage of the time, and as such, it may be seen that during the preheat phase of the cooking cycle illustrated in FIG. 3, a 3:4 broiler:bake duty cycle is used. It may also be seen that with such a duty cycle, temperatures in the middle, bottom and top of the oven (represented respectively by lines 106, 108, 110) generally track one another such that at the completion of the preheat phase (represented by line 112), the temperature throughout the oven cavity is generally the same. On the other hand, the preheat phase in this example takes 25:30 to reach the 450 degree setpoint.

Figure 4:
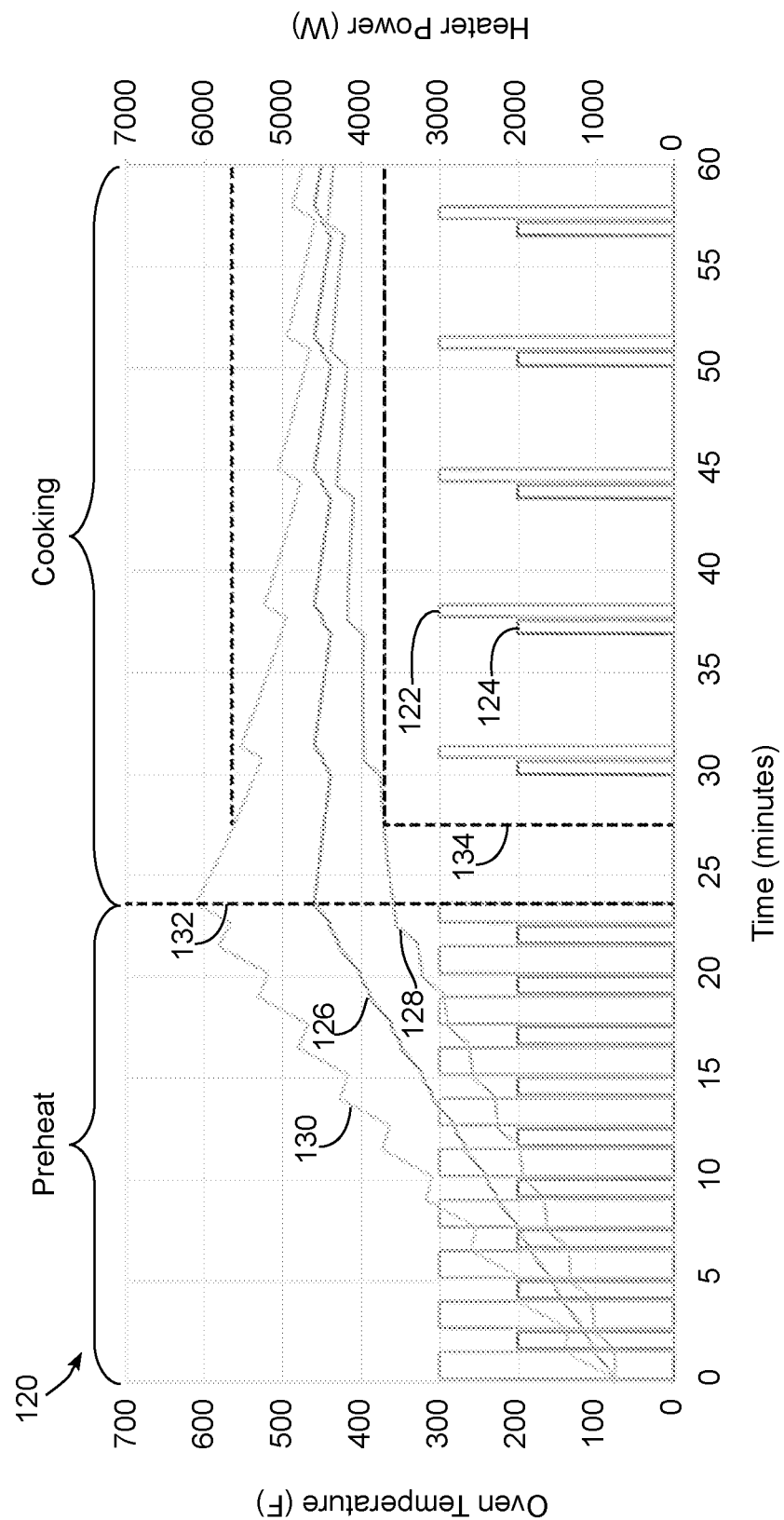
FIG. 4 is a graph of an example time-temperature curve for another example cooking appliance.

It is desirable, for user convenience, to have the oven preheat as fast as possible, and as such, one manner of accelerating the preheat phase is to adjust the duty cycle to activate the higher-powered broiler cooking element for a greater percentage of time. FIG. 4, for example, illustrates at 120 a time-temperature graph for a cooking cycle performed with the same temperature setpoint (450 degrees) and the same example cooking appliance including electric broiler and bake cooking elements, the activations of which are represented at 122 and 124, respectively. In this example, however, a 3:2 broiler:bake duty cycle is used, such that the higher power broiler cooking element is active for a greater percentage of time during the preheat phase.

It may also be seen that with such a duty cycle, the duration of the preheat phase (represented by line 132) is decreased by approximately 2 minutes; however, the temperatures in the middle, bottom and top of the oven (represented respectively by lines 126, 128, 130) diverge substantially, such that even three minutes after the preheat phase has completed (represented by line 134) there is greater than a 200 degree temperature differential between the bottom and top of the oven cavity (lines 128 and 130). As such, while the center oven temperature reaches the target temperature more quickly, it may reduce baking performance because the distribution of temperatures is very wide when food is placed in the oven.

In some embodiments consistent with the invention, however, a "post-preheat" phase may be used after the preheat phase is complete but prior to commencing the cooking phase in order to reduce temperature differentials within an oven cavity. In this regard, a post-preheat phase may be used in some embodiments to cycle one or more cooking elements disposed in a cooler portion of the oven cavity to reduce a temperature differential between the top and bottom of the oven cavity. Cycling, in this regard, may be considered to be activation of a cooking element during at least a portion of the post-preheat phase, and may include both full activation as well as variable activation if so supported in the cooking appliance, and may also include multiple activations at different points in the post-preheat phase in some embodiments.

Figure 5:
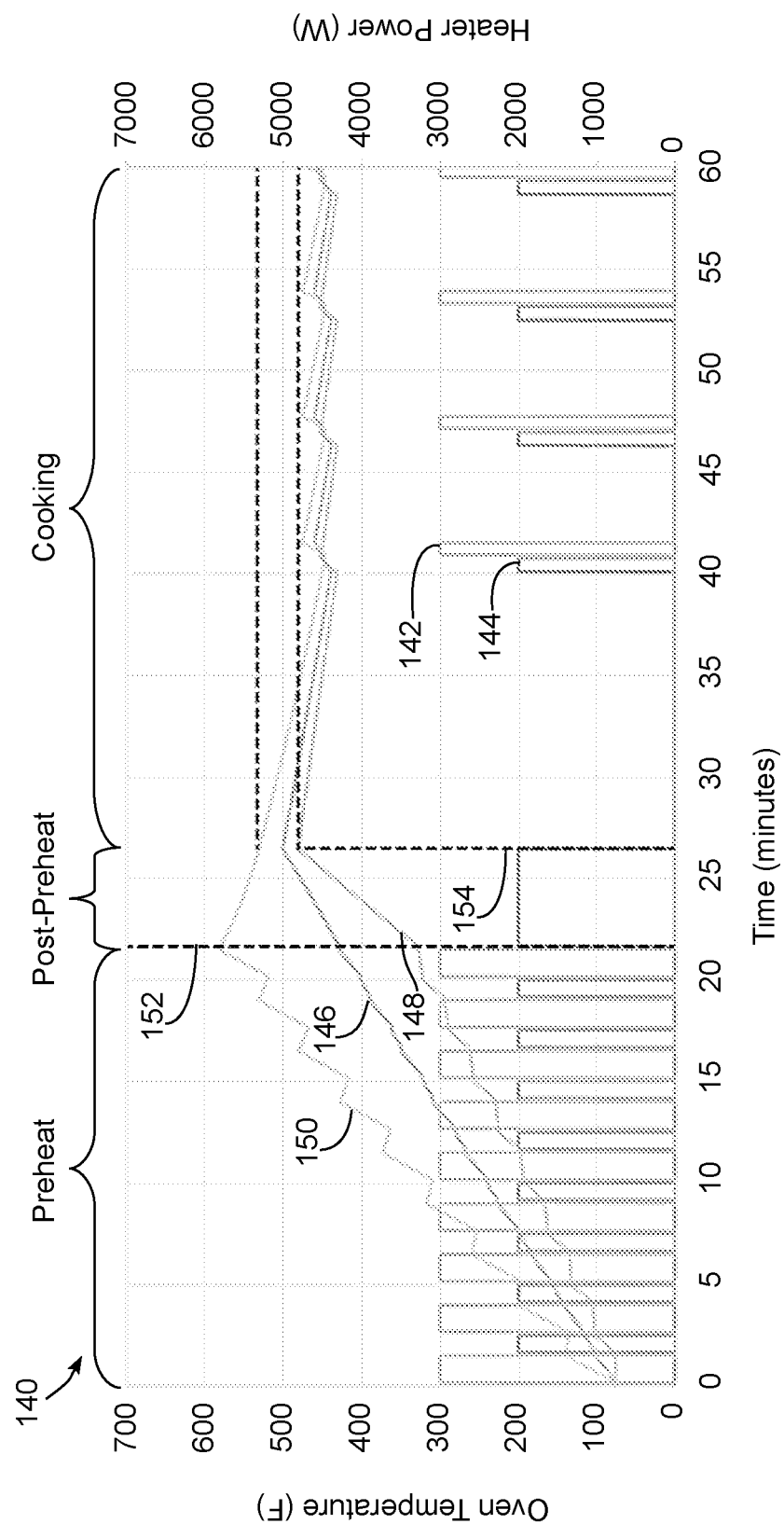
FIG. 5 is a graph of an example time-temperature curve for a cooking appliance employing a post-preheat phase consistent with some embodiments of the invention.

In one example implementation, a post-preheat phase may simply activate a cooking element in a cooler portion of an oven cavity for the entire duration of the post-preheat phase. Specifically, FIG. 5 illustrates at 140 a time-temperature graph for a cooking cycle performed with the same temperature setpoint (450 degrees) and the same example cooking appliance including electric broiler and bake cooking elements, the activations of which are represented at 142 and 144, respectively.

In this example, the same 3:2 broiler:bake duty cycle is used as with the cooking cycle of FIG. 4, so that the duration of the preheat phase (represented by line 152) is decreased by approximately 2 minutes compared with the cooking cycle of FIG. 3, and the same temperature differentials exist between the middle, bottom and top of the oven (represented respectively by lines 146, 148, 150).

However, rather than proceeding directly to a cooking phase where the bake and broiler cooking elements are periodically cycled to maintain the 450 degree temperature setpoint, a post-preheat phase (represented in FIG. 5 by the period between lines 152 and 154) is performed by activating the bake cooking element (i.e., the cooking element in the cooler portion of the oven cavity) until the temperature differential at the end of the approximately 4 minute post-preheat phase is about 50 degrees, substantially less than the 200 degree temperature differential illustrated in FIG. 4.

Figure 6:
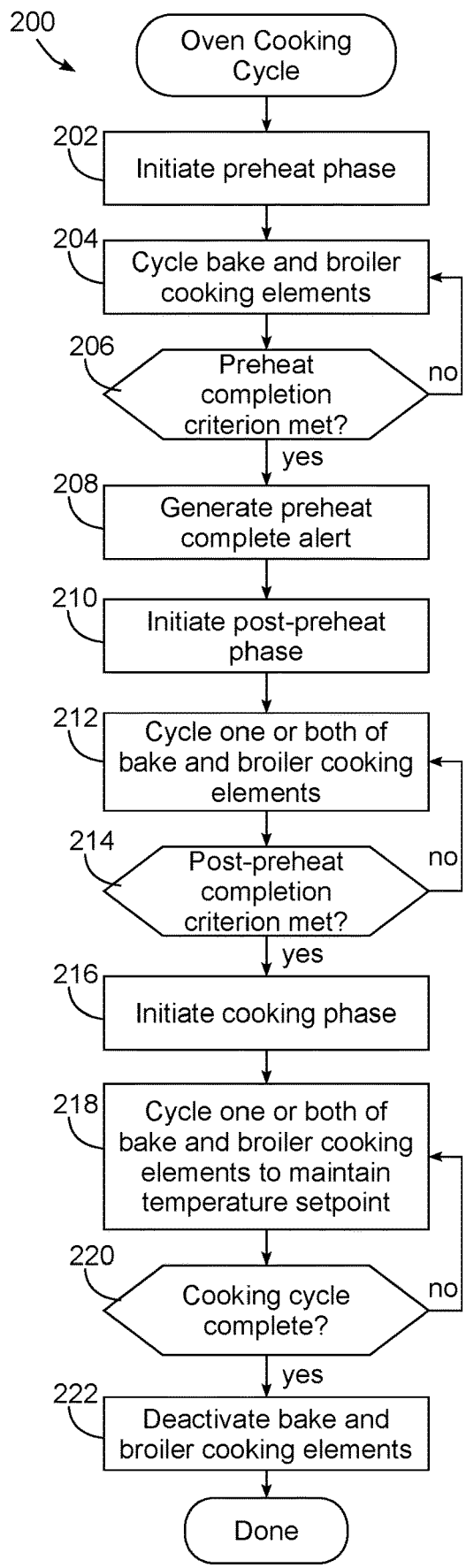
FIG. 6 is a flowchart illustrating an example sequence of operations for performing a cooking cycle using the cooking appliance of FIGS. 1-2, and employing a post-preheat phase consistent with some embodiments of the invention.

FIG. 6 illustrates an example sequence of operations 200 for performing a cooking cycle using a post-preheat phase consistent with some embodiments of the invention, and performed, for example, under the control of controller 42 of cooking appliance 10 of FIGS. 1-2. As shown in block 202, at the start of the cooking cycle (e.g., after a user has turned on the oven and selected a temperature setpoint, a preheat phase is initiated, and in block 204, the bake and broiler cooking elements may be cycled (e.g., by alternating between activating each of the cooking elements according to a desired duty cycle) during the preheat phase until a preheat completion criterion has been met (block 206). It will be appreciated that due to the use of the post-preheat phase, minimizing temperature differentials within the oven cavity may not be a priority during the preheat phase, and various preheat algorithms focused upon heating up the oven cavity as quickly as possible may be used.

The preheat completion criterion in some embodiments may be, for example, the user selected temperature setpoint being reached within the oven cavity, e.g., as sensed by a temperature sensor positioned near the center of the oven cavity. Other preheat completion criteria may be used in other embodiments, e.g., time-based criteria, other temperature-based criteria, etc.

Once the preheat completion criterion is determined to be met, block 206 passes control to block 208 to generate a preheat complete alert to the user, thereby notifying the user that the oven is now preheated to the desired temperature setpoint and that food may now be placed in the oven to cook. Various audible and/or visual alerts may be generated in different embodiments, including beeps, flashing indicators, messages on a display, or even notifications generated on a remote device such as a mobile phone.

Next, in block 210 a post-preheat phase may then be initiated, whereby one or both of the bake and broiler cooking elements may be cycled (block 212) until a post-preheat completion criterion has been determined to be met (block 214). As noted above, it may generally be desirable to primarily activate any cooking element in the cooler portion of the oven cavity at the completion of the preheat phase (generally the bottom of the oven cavity when electric cooking elements are used and the top of the oven cavity when gas cooking elements are used). In the example discussed above in connection with FIG. 5, during the post-preheat phase only the bake cooking element is activated, and the bake cooking element is activated for the entire duration of the post-preheat phase. In other embodiments, however, a cooking element may be activated for only a portion of a post-preheat phase, and in still other embodiments, other cooking elements disposed in other positions in an oven cavity, may also be activated at various times in the post-preheat phase.

The post-preheat completion criterion may vary in different embodiments. In some embodiments, for example, the post-preheat completion criterion may be temperature based, e.g., based upon a temperature sensed by a temperature sensor disposed proximate a middle, the top or the bottom of the oven cavity. As an example, where multiple temperature sensors are used, temperature differentials may be determined, such that the post-preheat phase may complete when the temperature differentials have decreased below a desired threshold. As another example, where an additional temperature sensor is used in the cooler portion of the oven cavity, the post-preheat phase may complete when the temperature in the cooler portion of the oven cavity reaches the temperature setpoint or some percentage thereof.

In other embodiments, the post-preheat completion criterion may be time based. As one example, a duration may be determined based upon the temperature setpoint, as it will be appreciated that higher temperature setpoints will require longer preheat phases, and will generally result in greater temperature differentials requiring additional time to be reduced. A table or formula may be used in some embodiments, for example, to determine the duration of the post-preheat phase based upon the temperature setpoint. As another example, the duration of the preheat phase may be measured and used to calculate a duration for the post-preheat phase (e.g., based on a table or formula), since the longer the preheat phase, generally the higher the temperature reached in the oven cavity and the greater temperature differentials, generally requiring a longer post-preheat phase.

Once the post-preheat completion criterion has been met, block 214 passes control to block 216 to initiate the cooking phase, and block 218 cycles one or both of the bake and broiler cooking elements to maintain the temperature setpoint until the cooking cycle is complete (block 220). Once the cooking cycle is complete (e.g., based upon a programmed cook time being reached or simply the user turning off the oven) block 220 passes control to block 222 to deactivate all cooking elements, and the cooking cycle is complete. It will be appreciated that based upon the type of cooking cycle selected by the user (e.g., bake, roast, convection bake, convection roast, broil, etc.), only one of the broiler and bake cooking elements may be used during the cooking phase, and that even if both cooking elements are used, the cooking elements may be activated for different durations and in different sequences as appropriate for the particular type of cooking cycle selected by the user.

It will therefore be appreciated that by employing a post-preheat phase in a cooking cycle, temperature differentials in an oven cavity may be decreased, irrespective of the preheat algorithm used during the preheat phase. Thus, a preheat algorithm used preceding a post-preheat phase may focus more specifically on speed rather than having to maintain a homogenous temperature profile throughout the oven cavity. It will also be appreciated that a multitude of different algorithms may be used for each of the preheat, post-preheat and cooking phases of a cooking cycle, so the invention is not limited to the specific algorithms disclosed herein.

Cooking Cycle with Two Stage Preheat Phase

It may also be desirable in some embodiments to use a two stage preheat phase in connection with or in lieu of a post-preheat phase. A two stage preheat phase, in this regard, may be considered to be a preheat phase in which two different cooking elements (or sets of cooking elements), one of which positioned proximate the top of the oven cavity, and one of which positioned proximate the bottom of the oven cavity, are sequentially activated a single time each, such that, during the entire preheat phase, each cooking element (or set of cooking elements) is activated exactly once during the preheat phase.

Generally, a two stage preheat phase may desirably begin with the highest power cooking element(s) being activated for a first stage of the preheat phase, followed by the other cooking element(s) being activated for a second stage of the preheat phase. As such, for an oven with electric cooking elements, it may be desirable to activate the broiler cooking element in the first stage, followed by the bake cooking element in the second stage. For gas cooking elements, on the other hand, it may be desirable to activate the bake cooking element prior to the broiler cooking element. Other orders of cooking elements, however, may be used in other embodiments.

It has been found, for example, that because a small amount of time (typically from 2 to 5 seconds) is generally required to switch between one cooking element and another in some cooking appliances, frequent cycling of cooking elements can cause delays to accumulate and significantly affect the time required to reach a target temperature. Thus, by simply separating preheating into two stages, with the first stage uses the higher-power cooking element to increase temperatures as quickly as possible, followed by a second stage that uses the lower-power cooking element to balance the oven temperature distribution, the overall preheat duration can be reduced while still achieving desirable temperature differentials.

Figure 7:
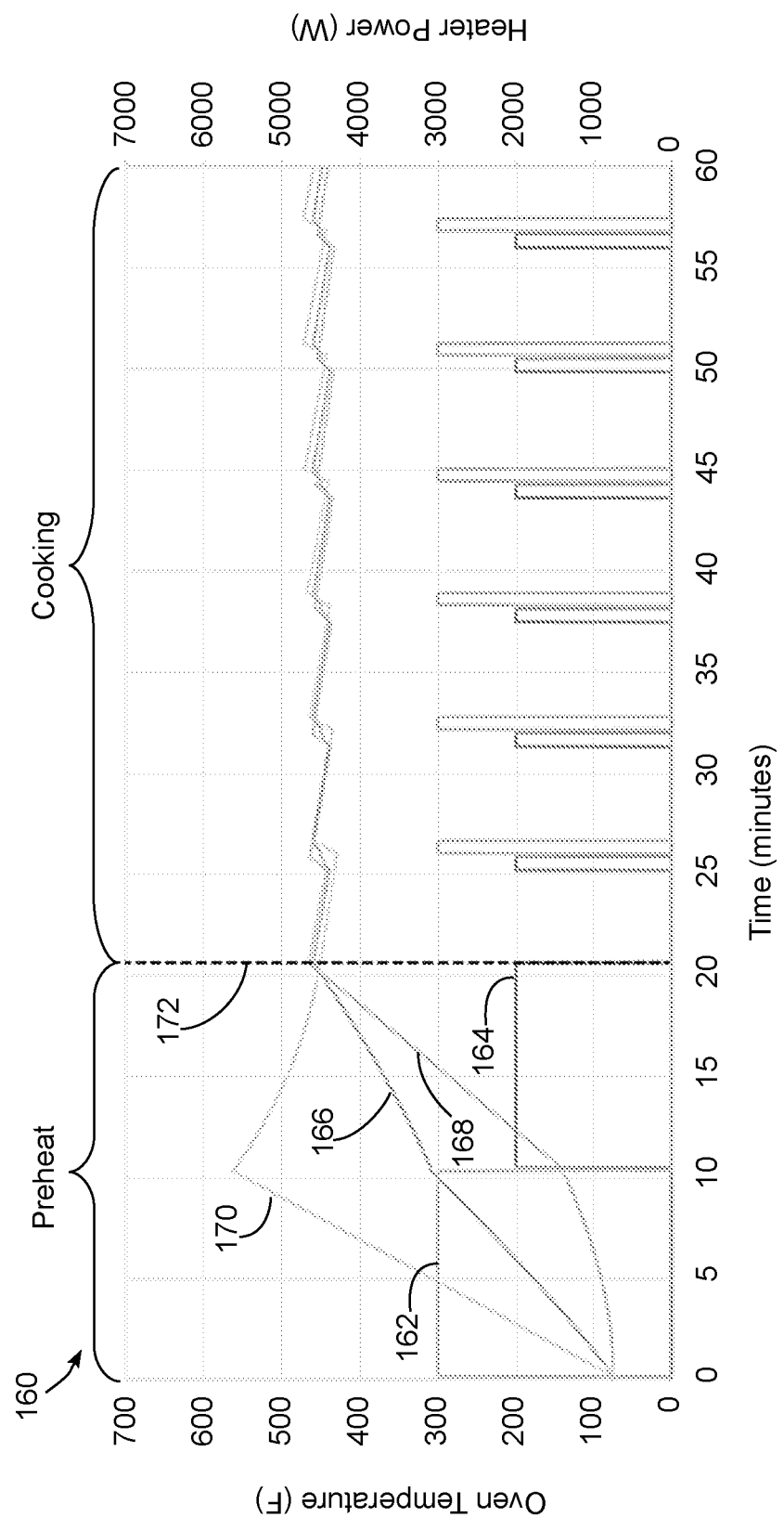
FIG. 7 is a graph of an example time-temperature curve for a cooking appliance employing a two stage preheat phase consistent with some embodiments of the invention.

FIG. 7, for example, illustrates at 160 a time-temperature graph for a cooking cycle performed with the same temperature setpoint (450 degrees) and the same example cooking appliance including electric broiler and bake cooking elements, the activations of which are represented at 162 and 164, respectively. In this example, a two stage preheat phase is performed, where during a first stage the broiler cooking element is activated (a little over 10 minutes) and during a second stage the bake cooking element is activated. With this configuration, the duration of the preheat phase (represented by line 172) is decreased by approximately 5 minutes compared with the cooking cycle of FIG. 3. Moreover, while the temperature differentials between the middle, bottom and top of the oven (represented respectively by lines 166, 168, 170) are substantial at the end of the first stage, by the end of the second stage of the preheat phase, they are effectively eliminated.

Figure 8:
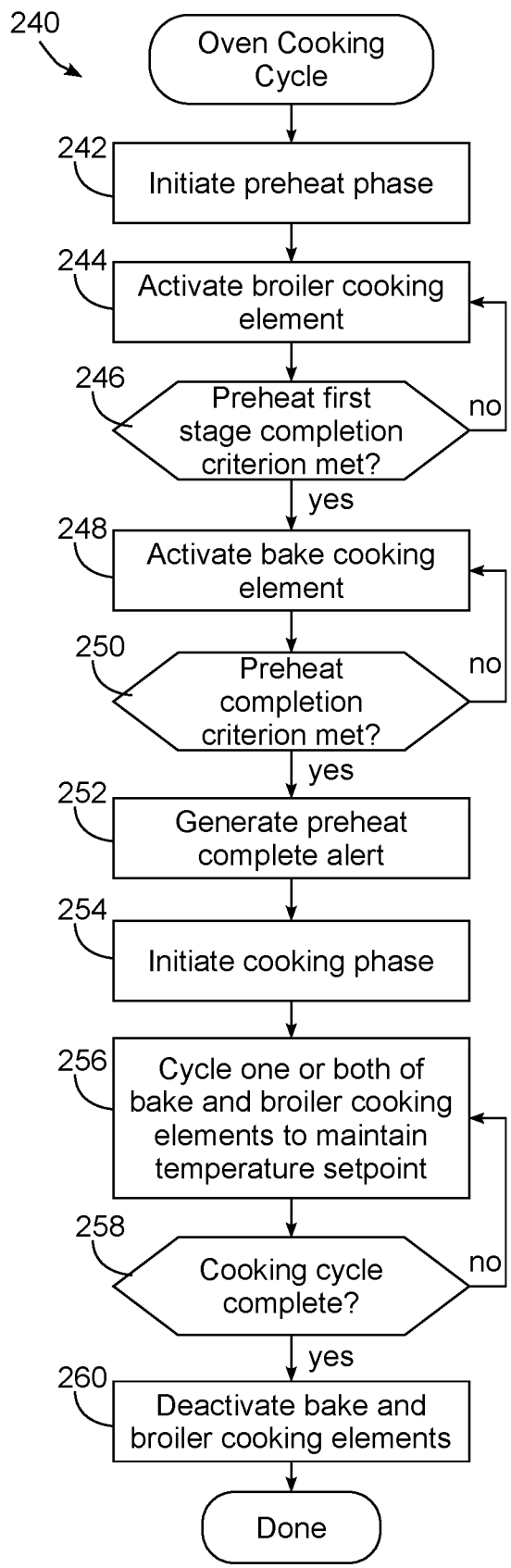
FIG. 8 is a flowchart illustrating another example sequence of operations for performing a cooking cycle using the cooking appliance of FIGS. 1-2, and employing a two stage preheat phase consistent with some embodiments of the invention.

FIG. 8 illustrates an example sequence of operations 240 for performing a cooking cycle using a two stage preheat phase consistent with some embodiments of the invention, and performed, for example, under the control of controller 42 of cooking appliance 10 of FIGS. 1-2. As shown in block 242, at the start of the cooking cycle (e.g., after a user has turned on the oven and selected a temperature setpoint, a preheat phase is initiated, and in block 244, the broiler cooking element may be activated during a first stage until a preheat first stage completion criterion has been met (block 246).

The preheat first stage completion criterion in some embodiments may be temperature based in some embodiments, or may be time or duration based in some embodiments. In some embodiments, for example, the criterion may be based on reaching a predetermined temperature (e.g., 275 degrees), or a predetermined percentage of the temperature setpoint (e.g., 66% of the temperature setpoint, such as 300 degrees for a 450 degree setpoint), as sensed by a temperature sensor. In other embodiments, the criterion may be based on a predetermined duration (e.g., after 10 minutes), or a predetermined percentage of a preheat duration (e.g., 50% of the expected preheat phase duration). Other criteria, including combinations of temperature and time, may be used in other embodiments.

Once the preheat first stage completion criterion is determined to be met, block 246 passes control to block 248 to initiate the second stage of the preheat phase and activate the bake cooking element. The bake cooking element remains active until a preheat completion criterion is met, as determined by block 250. The preheat completion criterion in some embodiments may be, for example, the user selected temperature setpoint being reached within the oven cavity, e.g., as sensed by a temperature sensor positioned near the center of the oven cavity. Other preheat completion criteria may be used in other embodiments, e.g., time-based criteria, other temperature-based criteria, etc.

Once the preheat completion criterion is determined to be met, block 250 passes control to block 252 to generate a preheat complete alert to the user, thereby notifying the user that the oven is now preheated to the desired temperature setpoint and that food may now be placed in the oven to cook. Various audible and/or visual alerts may be generated in different embodiments, including beeps, flashing indicators, messages on a display, or even notifications generated on a remote device such as a mobile phone.

Next, control passes to block 254 to initiate the cooking phase, and block 256 cycles one or both of the bake and broiler cooking elements to maintain the temperature setpoint until the cooking cycle is complete (block 258). Once the cooking cycle is complete (e.g., based upon a programmed cook time being reached or simply the user turning off the oven) block 258 passes control to block 260 to deactivate all cooking elements, and the cooking cycle is complete. It will be appreciated that based upon the type of cooking cycle selected by the user (e.g., bake, roast, convection bake, convection roast, broil, etc.), only one of the broiler and bake cooking elements may be used during the cooking phase, and that even if both cooking elements are used, the cooking elements may be activated for different durations and in different sequences as appropriate for the particular type of cooking cycle selected by the user.

It will therefore be appreciated that by employing a two stage preheat phase in a cooking cycle, preheating may be accelerated, yet still enable temperature differentials to recover prior completion of the preheat phase. It will also be appreciated, however, that it may be desirable in some embodiments to combine a two stage preheat phase with a post-preheat phase, so the two aforementioned techniques may (but are not required to) be used together in some embodiments. For example, where a two stage preheat phase reduces, but does not fully minimize temperature differentials, it may be desirable in some embodiments to incorporate a post-preheat phase in order to further reduce temperature differentials in the oven cavity prior to transitioning to a cooking phase of a cooking cycle. In some embodiments, for example, it may be desirable to dynamically determine whether to utilize a post-preheat phase at the completion of a two stage preheat phase, and optionally how long the post-preheat phase should be performed. Such a dynamic determination may be made, for example, based upon thermal analysis of the oven cavity, sensing temperatures at multiple positions in the oven cavity, or based upon empirical testing.

It will be appreciated that various modifications may be made to the embodiments discussed herein, and that a number of the concepts disclosed herein may be used in combination with one another or may be used separately. Therefore, the invention lies in the claims hereinafter appended.

What is claimed is:

1. A cooking appliance, comprising:
    a housing including an oven cavity;
    a temperature sensor configured to sense a temperature within the oven cavity;
    a plurality of cooking elements configured to generate heat within the oven cavity, the plurality of cooking elements including at least one cooking element positioned proximate a bottom of the oven cavity and at least one cooking element positioned proximate a top of the oven cavity; and
    a controller in communication with the temperature sensor and configured to control the plurality of elements to perform a cooking cycle within the oven cavity to cook at a user selected predetermined temperature setpoint, wherein the controller is configured to perform the cooking cycle by:
        during a cooking phase of the cooking cycle, cycling one or more of the plurality of cooking elements to maintain the predetermined temperature setpoint;
        during a preheat phase preceding the cooking phase, cycling one or more of the plurality of cooking elements to heat at least a first portion of the oven cavity to reach the predetermined temperature setpoint; and
        during a post-preheat phase subsequent to the preheat phase, preceding the cooking phase, and before a second, cooler portion of the oven cavity that is cooler than the first portion of the oven cavity has reached the predetermined temperature setpoint, cycling one or more of the plurality of cooking elements disposed in the second, cooler portion of the oven cavity once the first portion of the oven cavity has reached the predetermined temperature setpoint to reduce a temperature differential between the top and bottom of the oven cavity;
    wherein the controller is configured to transition from the post-preheat phase to the cooking phase in response to determining that a post-preheat completion criterion has been met; and
    wherein the controller is configured to determine that the post-preheat completion criterion has been met based upon a temperature sensed by the temperature sensor disposed proximate a middle, the top or the bottom of the oven cavity, based upon a duration calculated based upon the predetermined temperature setpoint, or based upon a duration calculated based upon a duration of the preheat phase.

2. The cooking appliance of claim 1, wherein the controller is further configured to generate a user alert upon completion of the preheat phase to notify a user that the temperature setpoint has been reached.

3. The cooking appliance of claim 2, wherein the controller is configured to perform the post-preheat phase subsequent to generating the user alert.

4. The cooking appliance of claim 1, wherein cycling the one or more of the plurality of cooking elements during the preheat phase causes the top of the oven cavity to be at a higher temperature than the bottom of the oven cavity, and wherein the controller is configured to cycle the one or more of the plurality of cooking elements during the post-preheat phase disposed in the cooler portion of the oven cavity by activating only the at least one cooking element positioned proximate the bottom of the oven cavity during the post-preheat phase.

5. The cooking appliance of claim 1, wherein cycling the one or more of the plurality of cooking elements during the preheat phase causes the top of the oven cavity to be at a lower temperature than the bottom of the oven cavity, and wherein the controller is configured to cycle the one or more of the plurality of cooking elements during the post-preheat phase disposed in the cooler portion of the oven cavity by activating only the at least one cooking element positioned proximate the top of the oven cavity during the post-preheat phase.

6. The cooking appliance of claim 1, wherein the controller is configured to cycle the one or more of the plurality of cooking elements during the post-preheat phase disposed in the cooler portion of the oven cavity by activating only and for an entire duration of the post-preheat phase the at least one cooking element positioned proximate the top of the oven cavity or the at least one cooking element positioned proximate the bottom of the oven cavity.

7. The cooking appliance of claim 1, wherein the controller is configured to cycle the one or more of the plurality of cooking elements during the preheat phase by alternating between the at least one cooking element positioned proximate the top of the oven cavity and the at least one cooking element positioned proximate the bottom of the oven cavity.

8. The cooking appliance of claim 7, wherein the at least one cooking element positioned proximate the top of the oven cavity comprises an electrical broiler cooking element, the at least one cooking element positioned proximate the bottom of the oven cavity comprises an electrical bake cooking element, and the controller is configured to alternate between the at least one cooking element positioned proximate the top of the oven cavity and the at least one cooking element positioned proximate the bottom of the oven cavity by alternating between the electrical broiler cooking element and the electrical bake cooking element with a duty cycle in which the electrical broiler cooking element is operated longer than the electrical bake cooking element.

9. The cooking appliance of claim 7, wherein the at least one cooking element positioned proximate the top of the oven cavity comprises a gas broiler cooking element, the at least one cooking element positioned proximate the bottom of the oven cavity comprises a gas bake cooking element, and the controller is configured to alternate between the at least one cooking element positioned proximate the top of the oven cavity and the at least one cooking element positioned proximate the bottom of the oven cavity by alternating between the gas broiler cooking element and the gas bake cooking element with a duty cycle in which the gas bake cooking element is operated longer than the gas broiler cooking element.

10. The cooking appliance of claim 1, wherein the controller is configured to transition from the preheat phase to the post-preheat phase in response to determining that a preheat completion criterion has been met.

11. The cooking appliance of claim 10, wherein the preheat completion criterion is met when a temperature sensed by a temperature sensor in the oven cavity senses that the predetermined temperature setpoint has been reached.

12. The cooking appliance of claim 1, wherein the controller is configured to cycle the one or more of the plurality of cooking elements during the preheat phase by sequentially activating the at least one cooking element positioned proximate the top of the oven cavity a single time during the preheat phase and activating the at least one cooking element positioned proximate the bottom of the oven cavity a single time during the preheat phase.

13. The cooking appliance of claim 1, wherein the controller is configured to determine that the post-preheat completion criterion has been met based upon the temperature sensed by the temperature sensor disposed proximate the middle, the top or the bottom of the oven cavity.

14. The cooking appliance of claim 1, wherein the controller is configured to determine that the post-preheat completion criterion has been met based upon the duration calculated based upon the predetermined temperature setpoint.

15. The cooking appliance of claim 1, wherein the controller is configured to determine that the post-preheat completion criterion has been met based upon based upon the duration calculated based upon the duration of the preheat phase.

* * * * *